United States Patent [19]
Haffner et al.

[11] 3,856,090
[45] Dec. 24, 1974

[54] SOD CUTTER BLADE MOUNTING

[75] Inventors: Donald G. Haffner, Greendale; Anthony J. Saiia, South Milwaukee, both of Wis.

[73] Assignee: Jacobson Manufacturing Company, Racine, Wis.

[22] Filed: Feb. 15, 1974

[21] Appl. No.: 442,877

[52] U.S. Cl. ................................. 172/20, 172/101
[51] Int. Cl. ............................................. A01b 45/04
[58] Field of Search .......... 172/20, 19, 101, 484, 96

[56] References Cited
UNITED STATES PATENTS

| | | | |
|---|---|---|---|
| 3,540,535 | 11/1970 | Brower | 172/20 |
| 3,662,837 | 5/1972 | Rothi | 172/20 |
| 3,738,431 | 6/1973 | Gennow | 172/20 |

*Primary Examiner*—Stephen C. Pellegrino
*Attorney, Agent, or Firm*—Arthur J. Hansmann

[57] ABSTRACT

A sod cutter blade mounting for use in a sod cutting machine and the blade being the one extending transversely of the fore-and-aft direction of the machine for severing the sod into desired lengths. The mounting is a pivotal type, including an upper link and a lower rod, both being pivotally supported on the machine and forming essentially a parallelogram with the locations thereof and the blade support itself. The rod has a compression spring thereon for yieldingly urging the blade in a forward direction but permitting the blade to swing rearwardly relative to the machine and as the machine advances forwardly, so that the blade remains in position with the sod while cutting same, and the rod is slidably mounted in a bracket and is removable therefrom for substitution of another compression spring which gives a different spring action to the blade, such that one spring can cause the blade to move forwardly and roll the sod, and the other spring will not move the blade forwardly for rolling the sod.

6 Claims, 4 Drawing Figures

PATENTED DEC 24 1974 3,856,090

3,856,090

SOD CUTTER BLADE MOUNTING

This invention relates to a sod cutter blade mounting for use in a sod cutting machine, and, specifically, it relates to the mounting of the sod cutter blade which is disposed transverse of the fore-and-aft direction of the sod cutting machine and cuts the sod into certain lengths of ribbons of sod.

BACKGROUND OF THE INVENTION

The prior art is aware of sod cutting machines which move over a field and strip the sod by slicing the sod into a long ribbon and slicing the ribbon from the ground below it and finally by cutting the ribbon into certain lengths by means of a blade disposed transverse to the machine. The lengths of sod ribbons can also be formed into rolls of sod by the machine itself. U.S. Pat. No. Re 24,432 shows these cutter elements of a sod machine, and other patents show the elements, such as U.S. Pat. Nos. 2,942,674 and 3,387,666 and 3,662,837 and 3,738,431.

The prior art sod cutting machines have been concerned with the support and the action of the transverse cutting blade, that is the blade which cuts the ribbons of sod into certain lengths of ribbons. This concern includes consideration for mounting the transverse blade so that it may either move with or move relative to the forward movement of the machine while the blade is moving up and down in its action in cutting the sod into ribbons of certain lengths. Further, the prior art is concerned with the action of this transverse cutting blade as it relates to forming the roll of sod after the sod has been cut into ribbons of certain lengths.

The present invention is concerned with mounting the transverse cutting blade such that the blade will efficiently cut the sod into ribbons of certain lengths and will move rearwardly relative to the machine as the machine advances forwardly so that there will be no undue strain on the blade and so that the blade can make an efficient and clean cut in the sod. Further, the present invention provides a sod cutter blade mounting wherein the blade itself can be utilized for initiating the rolling of the sod into its roll.

The aforementioned features and objectives are accomplished with a sod cutter blade mounting which is efficient in its action, which accurately cuts the sod into the desired lengths of ribbons, and which can be easily provided and maintained in that it is not a complicated and expensive type of mounting.

Still further, this invention provides a sod cutter blade mounting wherein the mounting can be converted between two different modes so that the blade itself can either be used for initiating the rolling of the sod or it can be used without initiating the rolling of the sod, according to the desires of the operator.

Other objects and advantages will become apparent upon reading the following description in light of the accompanying drawings.

DETAILED DESCRIPTION OF THE PREFERRED EMBODIMENT

It will of course be understood by one skilled in the art that the present invention relates to a sod cutting machine, such as the machines mentioned at the outset of this document. That is, this invention relates to a self-propelled sod cutting machine which has the usual machine frame and ground supporting wheels and it also has the usual two side cutting blades and the blade which slides underneath the sod for cutting the sod loose from the ground below. Of course the machine to which this invention pertains also has the handlebars or like steering means for guiding the machine and it has the engine and attending parts connected relative to each other for powering the machine as well as powering the blade mounting of this invention. Since the present invention does not involve the entire sod cutting machine, an entire machine is not shown nor is it necessary to show the entire machine in order to have one skilled in the art fully understand the construction of the blade mounting section of the sod cutting machine. For instance, U.S. Pat. No. 2,942,674 shows the overall construction of a sod cutting machine to which the present blade mounting can be applied.

Figure 1:
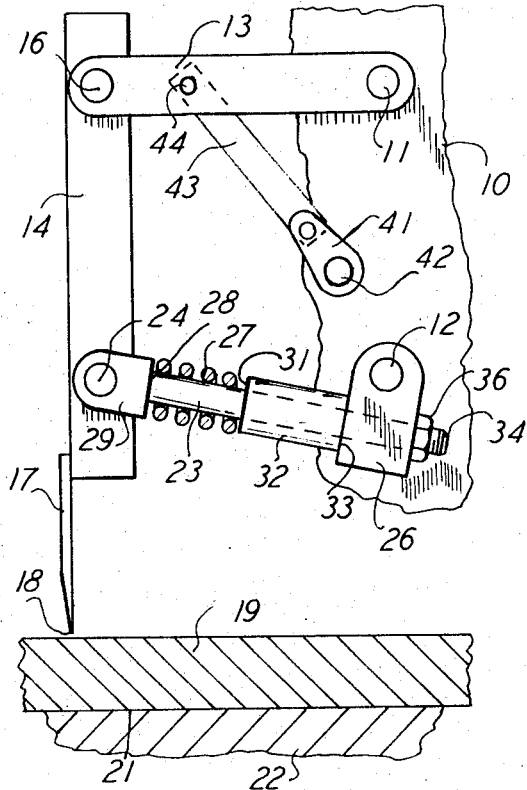
FIGS. 1, 2 and 3 show one embodiment of this invention in sequential positions of severing and rolling the sod, in relation to the advance of the machine.

The drawings show the sod cutter machine which includes the frame indicated at 10 which suitably pivotally supports the upper pivot shaft or mounting 11 and the lower pivot shaft or mounting 12 which are spaced apart as shown. A link 13 is supported on the mounting member 11, and it in turn connects to a blade arm or supporting member 14 by means of a pivot pin 16, as shown. The lower end of the support member or arm 14 carries the sod cutting blade 17 which has its cutting edge 18 disposed transversely of the fore-and-aft direction of the sod cutter machine for severing the sod ribbon, as indicated at 19, into the desired lengths of the ribbon. It will of course be understood that a sod cutting knife is also mounted on the machine and the knife is disposed forwardly of the blade 17 and is therefore cutting the sod at a horizontal line designated 21 to sever the sod from the ground shown below at 22. Of course the blade 17 can be suitably supported or connected to the support member 14, in any conventional arrangement, and the blade 17 is generally vertically disposed as seen in the FIG. 1 position just prior to cutting the sod 19.

A rod 23 is also pivotally connected to the support member 14 by means of the pin 24, and there is a pivot support or bracket 26 which is pivotally mounted on the pivot mounting member 12. The rod 23 slidably extends through the bracket 26, and thus the lower end of the blade assembly, including the member 14 and the blade 17 itself, can swing rearwardly relative to the sod cutter machine or frame 10, such as in the position shown in FIG. 2. A compression spring 27 is disposed on the rod 23 and abuts the end 28 of a connector 29 which joins the rod 23 to the pin 24. The other end of the spring 27 abuts the end 31 of a spacer or sleeve 32 which is slidable on the rod 23, and the opposite end 33 of the spacer 32 abuts the bracket 26. The rod 23 is threaded at its end 34, and a nut 36 limits the movement of the rod 23 to the left as viewed in the drawings and with respect to the bracket 26.

Figure 2:
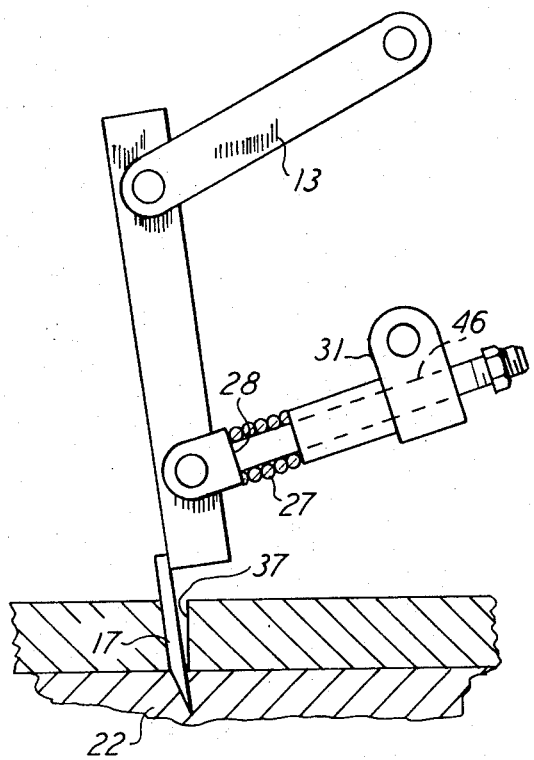

FIG. 2 thus shows that when the blade 17 is lowered into the sod 19 to form the transverse cut designated 37, the blade 17 actually extends into the ground 22 below the sod 19. Also, the spring 27 and spacer 32 move relative to the rod 23 so that the blade 17 is disposed at an angle, relative to its vertical or upright orientation in FIG. 1, as shown in FIG. 2. With this arrangement, the blade 17 is permitted to stay in the transverse cut 37, rather than move forwardly or to the left as shown in the drawings, while the machine is normally moving forwardly which is to the left as shown in the drawings. Therefore, the blade 17 is not unduly strained in that it need not plow the ground during the forward movement of the machine, and it permits the blade 17 to make a clean cut in the sod 19.

Figure 3:
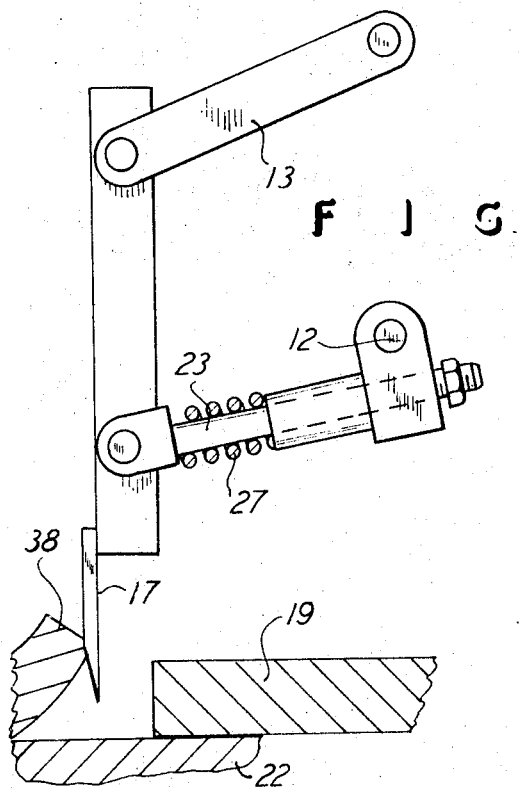

Of additional advantage, FIG. 3 shows that when the blade 17 is moved upwardly from the position shown in FIG. 2, the blade tip 18 clears the ground 22 and then only the lower end of the blade 17 has any resistance thereon, and this resistance is only the ribbon of sod 19, and thus the blade can initiate the roll in the sod by turning up the sod end designated 38 in FIG. 3. That is, when the blade 17 is moving upwardly to the FIG. 3 position, then the spring 27 is sufficiently stiff to again swing the blade 17 back toward the upright position that it occupied in FIG. 1, and this action of the blade is of course relative to the sod cutter frame 10, and thus the blade 17 initiates the roll-up of the severed ribbon of sod, such as shown by the sod curled end 38. That is, the spring 27 moves the blade 17 forwardly, in addition to the normal forward movement of the machine 10 itself, and thus the blade mounting described herein causes the initiation of the rolling up of the sod.

Figure 4:
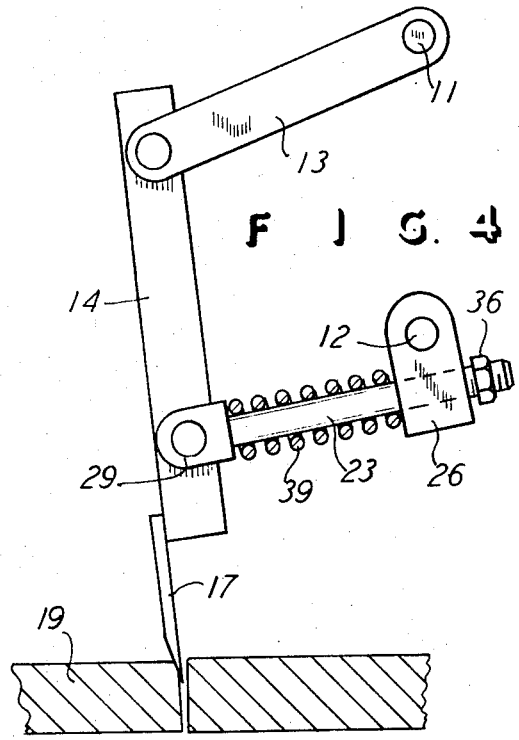
FIG. 4 shows the blade mounting embodiment of the other drawings, but it also shows the mounting in a converted form.

FIG. 4 shows another mode of arranging the sod cutter blade mounting, and in this instance the spring 27 and spacer 32 are removed from the rod 23, simply by removing the nut 36 and sliding the rod 23 off the bracket 26. Then, in place of the spring 27 and spacer 32, a longer but less stiff spring, relative to spring 27, is substituted for the spring 27 and sleeve 32, and that longer spring is shown to be spring 39 in FIG. 4. With spring 39 substituted in the mounting of this invention, the blade 17 will swing rearwardly, as shown in FIG. 2, but it will not be moved back to the forward or upright position, as shown in FIG. 3, until the blade 17 has cleared the sod 19. That is, with the spring 39, the mounting will not initiate the roll-up of the sod, and thus the curled end 38 will not be provided since the spring 39 is not strong enough to force the sod end 38 into the position shown in FIG. 3. With this arrangement, the machine can be used either for conditions where the roll-up of the sod is desired or where it is not desired. In both instances, the blade 17 will swing rearwardly, as shown in FIG. 2, when the sod is being severed into its ribbon, and therefore the blade will not plow the ground.

A substantially parallelogram type of mounting is provided, relative to the mounting members 11 and 12 and the attachment pins 16 and 24, and means are provided for causing the pivotal action described, and such means may include a crank arm 41 rotatable with a crankshaft 42 mounted on the frame 10. A connecting rod 43 pivotally connects to the link 13 through the pin 44. Each revolution of the shaft 42, induced by a motor not shown, will cause a complete lowering and raising cycle of the blade 17. It will be further noted that in the FIG. 2 position and mode, the spring 27 and the spacer 32 form a solid connection between the shoulder or end 28 and the bracket end 31, to thus provide a rearward limit to the swing of the blade 17 as shown in FIG. 2. Likewise, the spring 39 in FIG. 4 provides a solid piece when it is fully compressed and thus presents a rearward limit for the swing of the blade 17.

With the parallelogram arrangement, the blade 37 will move in a substantially upright orientation, even though it moves downwardly a distance sufficient to penetrate the ground 22. Also, the rod 34 can be threaded for a length to permit adjustable positioning of the nut 36 and thereby adjust the compression on the springs when the springs are in their fully extended positions. Further, the bracket 26 has an opening 46 which snugly receives the rod and thus permits the desired pivot action of the bracket 26 without binding the rod 23.

Further, with regard to the parallelogram arrangement, the blade 17 will move forwardly as it rises out of the ground 22 and it thus will move forwardly against the severed sod 38, in conjunction with but also in addition to the movement which is developed by the extension of the spring 27. That is, both the parallelogram arrangement and the employment of the spring 27 provide the desired blade forward motion, to say the position shown in FIG. 3, in order to commence the roll-up of the sod as shown at 38.

What is claimed is:

1. A sod cutter blade mounting for use in a sod cutting machine, comprising a sod-cutter blade uprightly disposed, two spaced-apart pivot mounting members, a link pivotally associated between said blade and one of said mounting members for swingably mounting said blade for movement from above and into and out of the sod being traversed by the sod cutting machine, a bracket mounted on the other of said mounting members, a rod pivotally associated with said blade and slidably mounted on said bracket for controlling the swinging movement of said blade, and a compression spring on said rod and disposed intermediate said bracket and said blade for yieldingly urging said blade away from said bracket and allow said blade to have rearward movement relative to the sod cutting machine and the forward movement thereof and to thereby momentarily remain embedded in the sod while the sod cutting machine advances forwardly.

2. The sod cutter blade mounting as claimed in claim 1, including a blade support member for attachment of said blade, said blade support member and said link and said rod and said two spaced-apart mounting members all being arranged and disposed to present a parallelogram configuration on the machine.

3. The sod cutter blade mounting as claimed in claim 1, including a releasable fastener on said rod for releasably securing said rod with said bracket, and said rod being removable from said bracket upon release of said fastener, and including a second compression spring of a stiffness less than that of said compression spring mentioned in claim 1, and with said second compression spring being selectively disposed on said rod in substitution of said compression spring mentioned in claim 1.

4. The sod cutter blade mounting as claimed in claim 1, including two of said compression springs of different stiffness for separate and alternative inclusion in said blade mounting, for yieldingly urging said blade away from said bracket with different forces according to which one of said springs is being used.

5. The sod cutter blade mounting as claimed in claim 1, including a spacer member slidably disposed on said rod intermediate said blade and said bracket, and said spring being in end-wise abutment with said spacer member, to have said spacer member and said spring form a solid limited length along said rod when said spring is fully compressed.

6. The sod cutter blade mounting as claimed in claim 1, wherein said rod is disposed at an elevation lower than that of said link and is disposed rearwardly of said blade relative to the forward direction of movement of said machine.

* * * * *